(12) United States Patent
Seo et al.

(10) Patent No.: US 7,262,605 B2
(45) Date of Patent: Aug. 28, 2007

(54) POWER SUPPLY APPARATUS

(75) Inventors: Kazuhiro Seo, Hirakata (JP); Kimihiko Furukawa, Kakogawa (JP)

(73) Assignee: Sanyo Electric Co., Ltd., Osaka (JP)

( * ) Notice: Subject to any disclaimer, the term of this patent is extended or adjusted under 35 U.S.C. 154(b) by 97 days.

(21) Appl. No.: 11/077,365

(22) Filed: Mar. 11, 2005

(65) Prior Publication Data

US 2005/0231169 A1    Oct. 20, 2005

(30) Foreign Application Priority Data

Mar. 30, 2004  (JP) .............................. 2004-101544
Feb. 24, 2005  (JP) .............................. 2005-049246

(51) Int. Cl.
*G01R 31/08*  (2006.01)
*G01N 27/416*  (2006.01)
*H02H 9/00*  (2006.01)

(52) U.S. Cl. ..................... 324/522; 324/434; 361/18
(58) Field of Classification Search ................. 324/525, 324/426, 522, 434; 361/18

See application file for complete search history.

(56) References Cited

U.S. PATENT DOCUMENTS

| 5,608,304 | A | * | 3/1997 | Okumura | 320/134 |
| 5,710,503 | A | * | 1/1998 | Sideris et al. | 324/431 |
| 6,208,117 | B1 | * | 3/2001 | Hibi | 320/134 |
| 6,269,011 | B1 | * | 7/2001 | Ohshima | 363/50 |
| 2004/0008457 | A1 | * | 1/2004 | Iimura et al. | 361/18 |
| 2004/0056616 | A1 | * | 3/2004 | Honda | 318/434 |

FOREIGN PATENT DOCUMENTS

JP          11-234801         8/1999

* cited by examiner

*Primary Examiner*—Anjan Deb
*Assistant Examiner*—Amy He
(74) *Attorney, Agent, or Firm*—McDermott Will & Emery LLP

(57) ABSTRACT

A power supply apparatus has a battery apparatus that is composed of a battery, a temperature sensor that is thermally coupled to the battery and whose electrical resistance changes with the temperature of the battery to which it is thermally coupled, a temperature detection circuit that detects the temperature of the battery by detecting the electrical resistance of the temperature sensor, and a power supply circuit that feeds electrical power to the temperature detection circuit. The temperature sensor is connected via an overcurrent protection circuit to the power supply circuit.

10 Claims, 5 Drawing Sheets

POWER SUPPLY APPARATUS

This application is based on Japanese Patent Applications Nos. 2004-101544 and 2005-049246 filed on Mar. 30, 2004 and Feb. 24, 2005, respectively, the contents of which are hereby incorporated by reference.

BACKGROUND OF THE INVENTION

1. Field of the Invention

The present invention relates to a power supply apparatus such as one designed for use in a vehicle to make it run. More particularly, the present invention relates to a power supply apparatus that uses a battery as an electric power source for driving a load and that incorporates a temperature detection circuit for detecting the temperature of the battery.

2. Description of Related Art

Power supply apparatuses that yield a high output voltage thanks to a plurality of batteries connected in series are used as power supply apparatuses for use in vehicles such as hybrid cars. This type of power supply apparatus incorporates a circuit for detecting the temperature of batteries. When batteries are charged or discharged at abnormally high temperatures, their performance deteriorates significantly. Thus, a power supply apparatus that is so built as to alleviate the deterioration of batteries due to high temperature detects the temperature of the batteries so that, when the temperature becomes higher than a set temperature, the charging or discharging current is limited or even cut altogether to protect the batteries.

There have already been developed power supply apparatuses designed for use in vehicles and incorporating a temperature detection circuit for detecting the temperature of batteries, an example being the one disclosed in Japanese Patent Application Laid-Open No. H11-234801 (hereinafter referred to as Patent Publication 1). The power supply apparatus disclosed in Patent Publication 1 includes a plurality of temperature sensors that are thermally coupled to battery cells. These temperature sensors change their electrical resistances with temperature. Moreover, these temperature sensors are connected in series with one another, and thus, when the temperature of any of the battery cells rises, the serial resistance of the serially connected temperature sensors increases. Hence, by detecting the electrical resistance of the circuit composed of the serially connected temperature sensors, it is possible to detect the battery temperature.

Moreover, when the power supply apparatus disclosed in Patent Publication 1 detects a fault such as short-circuiting of a temperature sensor, it operates a ventilation fan to expel the gas generated by the battery.

In this type of power supply apparatus, if a temperature sensor touches the surface of a battery and short-circuits to it, the temperature sensor is exposed to a high voltage, and is likely to cause failure of the circuit for detecting the electrical resistance of the temperature sensor. This fault can be prevented by isolating the circuit for detecting the electrical resistance of the temperature sensor from the battery. Even with this circuit design, however, if a plurality of temperature sensors short-circuit to the surface of the battery, an overcurrent flows through the circuit including the temperature sensors, causing failure of the circuit including those serially connected temperature sensors.

In a power supply apparatus mounted on a vehicle, it is desirable that, even if one temperature sensor short-circuits to a battery and makes the detection of the battery temperature partially impossible, other temperature sensors, i.e., those which are not short-circuited to the battery, be able to continue detecting the battery temperature. That is, what is important here is that the vehicle can keep running.

SUMMARY OF THE INVENTION

The present invention has been devised to overcome the above-discussed inconveniences experienced with conventional power supply apparatuses. It is therefore an object of the present invention to provide a power supply apparatus incorporating a circuit for detecting the temperature of a battery wherein the power supply apparatus is so built as to effectively prevent a fault thereof (in particular, in the temperature detection circuit thereof) resulting from an abnormal voltage being externally applied to a temperature sensor or to a circuit connected to a temperature sensor.

To achieve the above object, according to one aspect of the present invention, a power supply apparatus is provided with: a battery apparatus that is composed of a battery; a temperature sensor that is thermally coupled to the battery and whose electrical resistance changes with the temperature of the battery to which it is thermally coupled; a temperature detection circuit that detects the temperature of the battery by detecting the electrical resistance of the temperature sensor; and a power supply circuit that feeds electrical power to the temperature detection circuit. Here, the temperature sensor is connected via an overcurrent protection circuit to the power supply circuit.

In the circuit design described above, the temperature sensor thermally coupled to the battery is connected via the overcurrent protection circuit to the power supply circuit. Thus, even if, for example, the temperature sensor or a circuit connected thereto short-circuits to the surface of the battery and is exposed to a high voltage, the overcurrent protection circuit limits the current that flows through the temperature detection circuit or the like. Thus, it is possible to effectively prevent an overcurrent from flowing through the temperature detection circuit or the like and causing failure of the power supply apparatus.

Moreover, for example, the power supply circuit feeds a temperature detection current for producing a voltage across the temperature sensor thereto via the overcurrent protection circuit, and, for example when an abnormal voltage is externally applied to the temperature sensor, the overcurrent protection circuit limits, within a predetermined limit current level, the magnitude of the abnormal current that is caused by the abnormal voltage to flow into or out of the power supply circuit.

The power supply circuit feeds the temperature detection current for producing a voltage across the temperature sensor thereto via the overcurrent protection circuit. Thus, if an abnormal voltage is externally applied to the temperature sensor, an abnormal current that is caused by the abnormal voltage may flow into or out of the power supply circuit. On the other hand, since the power supply circuit feeds electric power to the temperature detection circuit, the abnormal current also passes through the temperature detection circuit.

Thus, there is a risk of the abnormal current causing failure of the temperature detection circuit or the like. With the circuit design described above, however, the magnitude of the abnormal current is limited, and this effectively prevents failure of the temperature detection circuit or the like ascribable to the abnormal voltage. Incidentally, an abnormal voltage that may be externally applied to the temperature sensor is fed from the battery as a result of, for example, the temperature sensor short-circuiting to the surface of the battery.

Moreover, for example, the overcurrent protection circuit includes: a diode that is connected to one end of the temperature sensor so that the forward direction of the diode coincides with the direction in which the temperature detection current flows; and a current controller that is connected to the other end of the temperature sensor and that, when the abnormal voltage is applied to the temperature sensor, limits the magnitude of the abnormal current within the predetermined limit current level.

Thus, when an abnormal voltage is externally applied to the temperature sensor, the current that tends to flow from one end of the temperature sensor to the power supply circuit is blocked by the diode, and the magnitude of the current that tends to flow from the other end of the temperature sensor to the power supply circuit is limited by the current controller. Thus, it is possible to effectively prevent failure of the temperature detection circuit or the like ascribable to the abnormal voltage.

Moreover, for example, the overcurrent protection circuit includes two sets, respectively connected to each end of the temperature sensor, of: a diode whose forward direction coincides with the direction in which the temperature detection current flows; and a current controller that, when the abnormal voltage is applied to the temperature sensor, limits the magnitude of the abnormal current within the predetermined limit current level.

Thus, when an abnormal voltage is externally applied to the temperature sensor, the current that tends to flow in the direction opposite to the forward direction of the diode is blocked by the diode, and the magnitude of the current that is caused by the abnormal voltage to flow through the power supply circuit is limited by the current controller. Thus, it is possible to effectively prevent failure of the temperature detection circuit or the like ascribable to the abnormal voltage.

Moreover, for example, the current controller includes: a bipolar transistor that receives a predetermined potential at the base thereof, that has the collector thereof connected to the temperature sensor, and that has the emitter thereof connected to a bias resistor.

Moreover, for example, the temperature detection circuit comprises a voltage detection circuit that detects the voltage produced across the temperature sensor by the temperature detection current so that the temperature detection circuit detects the electrical resistance of the temperature sensor based on the voltage across the temperature sensor as detected by the voltage detection circuit, and a protection resistor is provided between the voltage detection circuit and the temperature sensor.

The voltage detection circuit detects the voltage produced across the temperature sensor by the temperature detection current. Thus, when an abnormal voltage is externally applied to the temperature sensor, a current caused by the abnormal voltage may flow into or out of the voltage detection circuit side. When a protection resistor is provided as described above, however, the current caused by the abnormal voltage is reduced. Thus, it is possible to effectively prevent failure of the voltage detection circuit (temperature detection circuit) ascribable to the abnormal voltage.

Moreover, for example, a protection power supply circuit is provided on the voltage detection circuit side of the protection resistor, and the protection power supply circuit keeps, within a predetermined limit voltage range, the voltage applied to the voltage detection circuit side of the protection resistor.

The voltage detection circuit detects the voltage produced across the temperature sensor by the temperature detection current. Thus, when an abnormal voltage is externally applied to the temperature sensor, a voltage commensurate with the abnormal voltage may be applied to the voltage detection circuit side. When a protection power supply circuit is provided on the voltage detection circuit side of the protection resistor as described above, however, it is possible to effectively prevent failure of the voltage detection circuit (temperature detection circuit) ascribable to the abnormal voltage.

Moreover, for example, both ends of the temperature sensor are connected to the overcurrent protection circuit.

To achieve the above object, according to another aspect of the present invention, a power supply apparatus is provided with: a battery apparatus that is composed of a plurality of batteries; a plurality of temperature sensors of which each is thermally coupled to at least one of the batteries and whose electrical resistances change with the temperatures of the batteries to which they are thermally coupled; a temperature detection circuit that has, on the input side thereof, a multiplexer for switching among the temperature sensors for individual detection of the electrical resistances thereof and that detects the electrical resistances of the temperature sensors individually; and a power supply circuit that feeds electrical power to the temperature detection circuit. The temperature sensors are each connected via an overcurrent protection circuit to the power supply circuit.

In the circuit design described above, the temperature sensors thermally coupled to the batteries are connected via the overcurrent protection circuit to the power supply circuit. Thus, even if, for example, any of the temperature sensor or any circuit connected thereto short-circuits to the surface of the battery and is exposed to a high voltage, the overcurrent protection circuit limits the current that flows through the temperature detection circuit or the like. Thus, it is possible to effectively prevent an overcurrent from flowing through the temperature detection circuit or the like and causing failure of the power supply apparatus.

DETAILED DESCRIPTION OF PREFERRED EMBODIMENTS

Hereinafter, embodiments of the present invention will be described with reference to the accompanying drawings. It should be understood that the embodiments presented below deal with power supply apparatuses merely as examples of how the technical idea of the present invention can be put into practice, and therefore that the application of the present invention is not limited to the power supply apparatuses specifically presented below.

Power supply apparatuses embodying the invention are used chiefly as an electric power source for driving a motor (not illustrated) that makes a vehicle (not illustrated) run. This type of power supply apparatus yields a high output voltage thanks to a plurality of batteries connected in series, and can feed a large amount of electric power to a motor.

Figure 1:
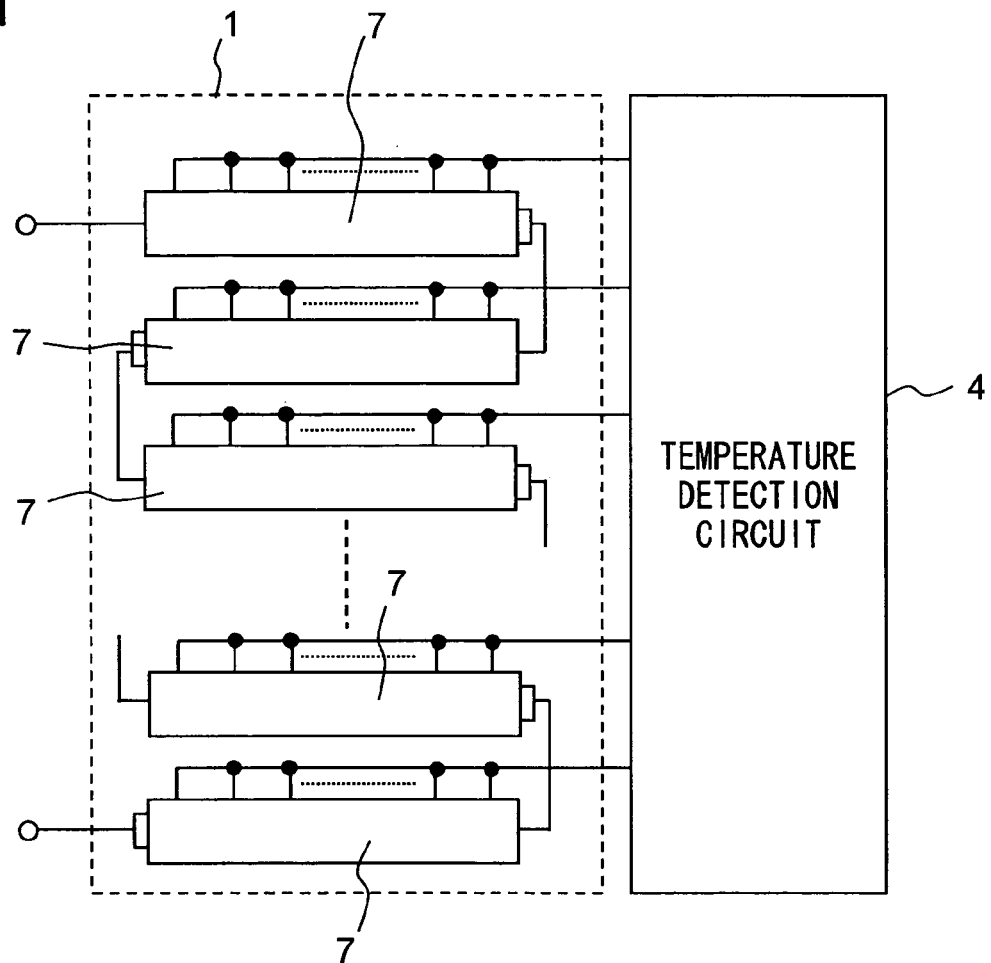
FIG. 1 is a diagram showing an outline of the circuit design of a power supply apparatus embodying the invention.
Figure 2:
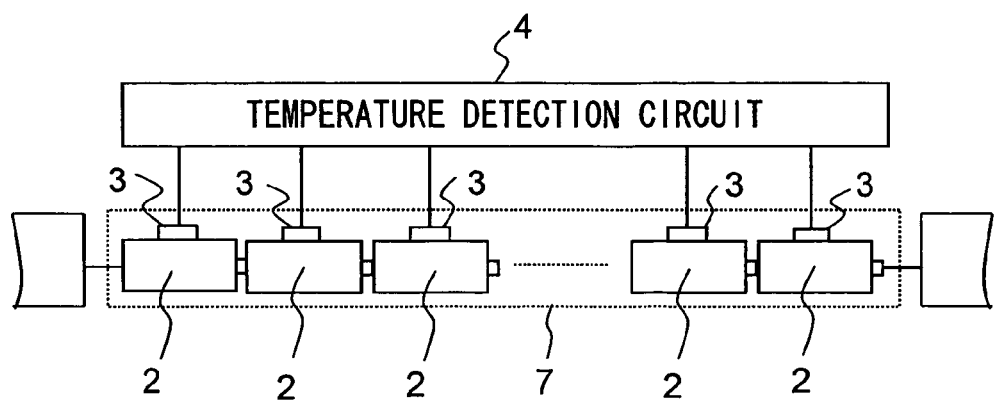
FIG. 2 is an enlarged view of the battery module shown in FIG. 1.
Figure 3:
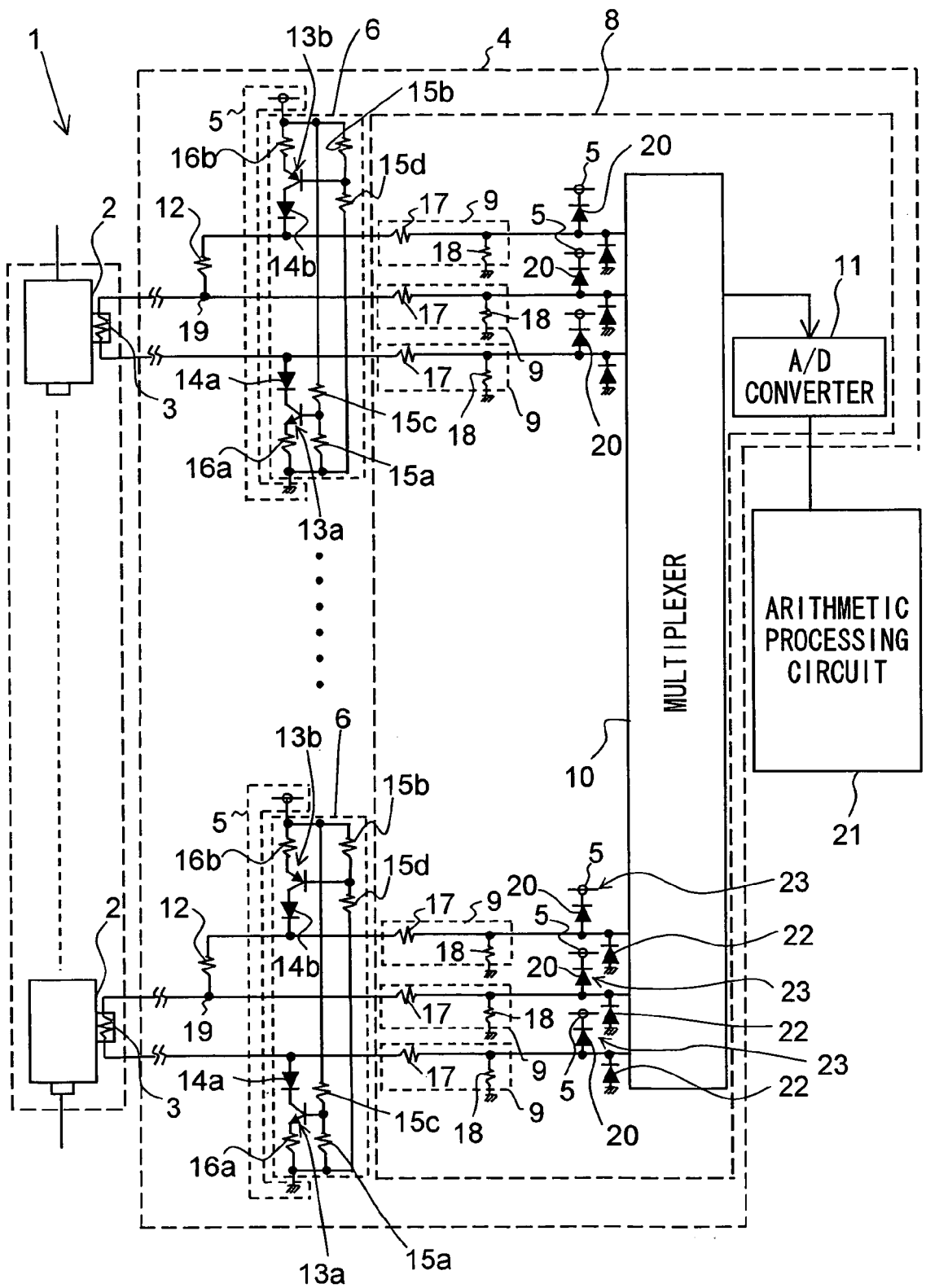
FIG. 3 is a circuit diagram of the temperature detection circuit shown in FIG. 1.

FIG. 1 is a diagram showing an outline of the circuit design of a power supply apparatus embodying the invention. FIG. 2 is an enlarged view of the battery module 7 shown in FIG. 1. FIG. 3 is a circuit diagram of the temperature detection circuit 4 shown in FIG. 1. In FIGS. 1, 2, and 3, the same components are identified with the same symbols. For a given component, no overlapping explanation thereof will be repeated.

The power supply apparatus shown in FIGS. 1, 2, and 3 includes: a battery apparatus 1 composed of a plurality of batteries 2 (not illustrated in FIG. 1) connected in series; the same number of temperature sensors 3 (not illustrated in FIG. 1) as there are batteries 2, with the temperature sensors 3 thermally coupled one-to-one to the batteries 2 constituting the battery apparatus 1 so that the temperatures of the batteries 2 can be detected individually; a temperature detection circuit 4 that detects the battery temperatures of the individual batteries 2 by detecting the electrical resistances of the individual temperature sensors 3; and a power supply circuit 5 (omitted in FIGS. 1 and 2) that feeds electric power to the temperature detection circuit 4. The power supply circuit 5 adopts a well-known circuit design, and therefore no detailed circuit design thereof is illustrated.

A plurality of batteries 2 are serially connected to form a battery module 7, and a plurality of such battery modules 7 are serially connected to form the battery apparatus 1. This permits the battery apparatus 1 to yield a high output voltage. Each battery module 7 is composed of four to ten batteries 2 connected in series. The batteries 2 are typically nickel hydride batteries or lithium ion secondary batteries, but may be batteries of any other rechargeable type, such as nickel cadmium batteries. The battery apparatus 1 has, for example, 30 to 60 battery modules 7 connected in series to yield an output voltage of 200 V to 400 V.

The temperature sensors 3 are thermally coupled one-to-one to the batteries 2 constituting the battery modules 7 so as to detect the battery temperatures of all the batteries. Each temperature sensor 3 is a device whose electrical resistance changes with temperature, for example a thermistor or a varistor. Thus, the temperature sensors 3 change the electrical resistances thereof with the temperatures of the batteries 2 to which they are thermally coupled. Using thermistors as the temperature sensors 3 makes it possible to detect the battery temperatures correctly and with high accuracy. This is because thermistors change the electrical resistances thereof with little variations. Among different types of thermistor, NTC devices having negative temperature coefficients are particularly suitable. In practice, however, any type of thermistor can be used so long as it changes the electrical resistance thereof with temperature; for example, it is possible to use PTC devices (breakers) or the like.

One temperature sensor 3 detects the temperature (battery temperature) of one battery 2. The temperature sensors 3 are so arranged as to be thermally coupled to all the batteries 2 on a one-to-one basis, and thus the battery temperatures are detected, independently of each other, by the temperature sensors 3 of which the same number are provided as there are batteries 2.

Alternatively, the temperature of a plurality of batteries 2 may be detected with one temperature sensor 3. This makes the number of temperature sensors 3 needed smaller than the number of batteries 2. In this case, each temperature sensor is arranged at the boundary of two batteries 2 so as to detect the temperature of both of the batteries 2 located at either side. It is possible even to provide heat conduction plates that are each thermally coupled to the surface of a plurality of batteries, with a temperature sensor fixed to each of such heat conduction plates so as to be thermally coupled thereto. This too makes it possible to detect the temperature of a plurality of batteries 2 with one temperature sensor. It is, however, preferable to provide at least one temperature sensor for each battery module.

The temperature detection circuit 4 detects the electrical resistances of the individual temperature sensors 3 by detecting the voltages across the individual temperature sensors 3. Here, the fact that the voltage equals the electrical resistance multiplied by the current is used. Specifically, the temperature detection circuit 4 detects the electrical resistances of the individual sensors 3 by detecting the voltages applied to the individual temperature sensors 3 and the currents that flow through the individual temperature sensors 3. The temperature detection circuit 4 includes a voltage detection circuit 8 that detects the electrical resistances of the individual temperature sensors 3 while switching them from one to another.

The voltage detection circuit 8 includes, on the input side thereof, a plurality of high-impedance voltage division circuits 9, and further includes: a multiplexer 10 connected to those high-impedance voltage division circuits 9; protection power supply circuits (voltage limiting circuits) 23 provided between the high-impedance voltage division circuits 9 and the multiplexer 10 so as to correspond one-to-one to the high-impedance voltage division circuits 9; and an A/D converter 11 connected to the output side of the multiplexer 10. The multiplexer 10 selects, as a target of which the voltage to detect, one of the temperature sensors 3 by switching them from one to another. This permits the electrical resistances of the individual temperature sensors 3 to be detected, and thus permits the temperatures of the individual batteries 2 to be detected based on those electrical resistances. As shown in FIG. 3, three high-impedance voltage division circuits 9 are provided for each temperature sensor 3, and the total number of protection power supply circuits 23 is equal to the total number of the high-impedance voltage division circuits 9.

The temperature detection circuit 4 further includes: the same number of overcurrent protection circuits 6 as there are temperature sensors 3, with the overcurrent protection circuits 6 corresponding one-to-one to the temperature sensors 3; and the same number of current detection resistors 12 as there are temperature sensors 3, with each current detection resistor 12 connected in series with one temperature sensor 3 to permit the current flowing through that temperature sensor 3 to be detected. The temperature sensors 3 are connected via the corresponding overcurrent protection circuits 6 to the power supply circuit 5.

In each temperature sensor 3, one terminal thereof (the upper one in FIG. 3) is connected to a positive-side output terminal of the power supply circuit 5 via a serial circuit composed of the current detection resistor 12 and the overcurrent protection circuit 6, and the other terminal thereof is connected via the overcurrent protection circuits 6 to ground, i.e., the negative side of the power supply circuit 5.

As shown in FIG. 3, the temperature detection circuit 4 has, for each temperature sensor 3, one overcurrent protection circuit 6, one current detection resistor 12, three high-impedance voltage division circuits 9, and three protection power supply circuits 23. The circuit designs of the overcurrent protection circuit 6, high-impedance voltage division circuit 9, and power supply circuit 23 will be described in detail later with reference to FIG. 4. Accordingly, no explanations will be given here of the components (the diode 14a, etc.) of the overcurrent protection circuit 6 etc. shown in FIG. 3.

The functions of and interconnection among the one overcurrent protection circuit 6, one current detection resistor 12, three high-impedance voltage division circuits 9, and three protection power supply circuits 23 that are provided for each temperature sensor 3 and the interconnection between these and the multiplexer 10 are the same among different temperature sensors 3. Accordingly, unless otherwise stated, the following descriptions are given with respect to a given single temperature sensor 3.

Figure 4:
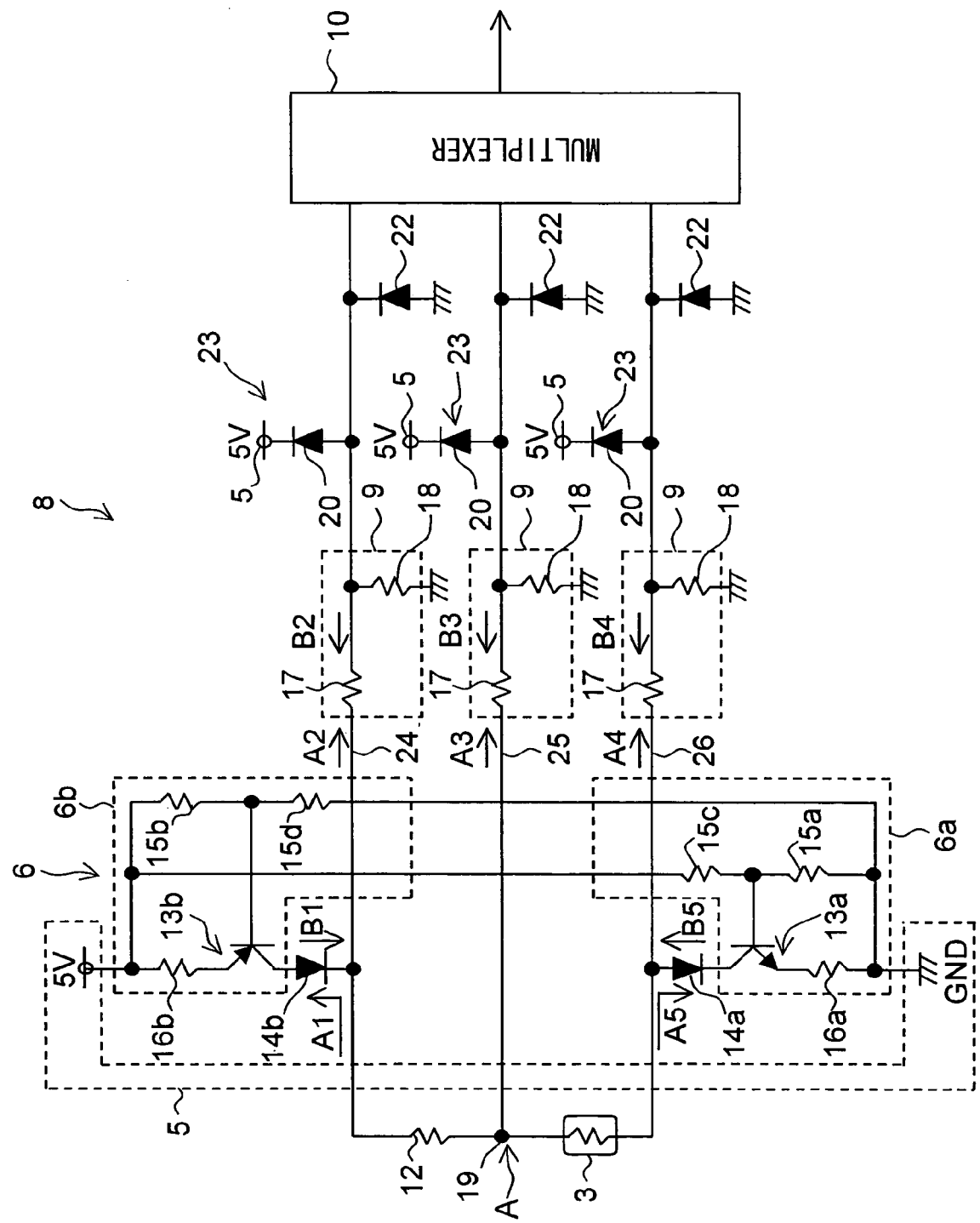
FIG. 4 is an enlarged view of the temperature detection circuit shown in FIG. 1, a circuit diagram illustrating the operation thereof in response to application of an abnormal voltage.

FIG. 4 is an enlarged view of the temperature detection circuit 4 shown in FIGS. 1 to 3, and is a circuit diagram showing the circuitry around a given single temperature sensor 3 as extracted from the rest. In FIG. 4, such portions as are found also in FIGS. 1 to 3 are identified with common symbols. No explanation will be repeated of the portions that have already been described with reference to FIG. 3.

When an abnormal voltage is externally applied to a temperature sensor 3 or to a circuit connected to a temperature sensor 3, the overcurrent protection circuit 6 limits, within a predetermined limit current level, the magnitude of the current (hereinafter referred to as an abnormal current) that is caused by the abnormal voltage to flow into or out of the power supply circuit 5. That is, the overcurrent protection circuit 6 prevents an overcurrent by limiting the magnitude of the current caused by the abnormal voltage within a current level permitted for an overvoltage or overcurrent. As will be understood from the following descriptions, in this embodiment, the overcurrent protection circuit 6 so operates as to keep the maximum value of the magnitude of the abnormal current substantially fixed irrespective of the magnitude of the abnormal voltage.

The abnormal voltage mentioned above is fed from a voltage source other than the power supply circuit 5 to the temperature sensor 3 or to the circuit connected to the temperature sensor 3. The voltage source that feeds the abnormal voltage to the temperature sensor 3 is, for example, the batteries 2. In the following descriptions, the state in which no such abnormal voltage is being applied to any temperature sensor 3 and the temperatures of the batteries 2 are being correctly (through with detection errors) detected is referred to as the "normal state".

The overcurrent protection circuit 6 is composed of a diode (forward direction diode) 14a provided on the low potential side of the temperature sensor 3 and accompanied by a current limiter 6a and a diode (forward direction diode) 14b provided on the high potential side of the temperature sensor 3 and accompanied by a current limiter 6b. The low potential side current limiter 6a is composed of an NPN-type bipolar transistor 13a (hereinafter referred to simply as the "transistor 13a"), a bias resistor 16a, and voltage division resistors 15a and 15c. The high potential side current limiter 6b is composed of a PNP-type bipolar transistor 13b (hereinafter referred to simply as the "transistor 13b"), a bias resistor 16b, and voltage division resistors 15b and 15d.

One end of the temperature sensor 3 is connected via the current detection resistor 12 to the cathode of the diode 14b. The transistor 13b has the collector thereof connected to the anode of the diode 14b, has the emitter thereof connected via the bias resistor 16b to the positive side output terminal of the power supply circuit 5, and has the base thereof connected to the node between the voltage division resistors 15b and 15d. The terminal of the voltage division resistor 15b opposite to the terminal thereof connected to the voltage division resistor 15d is connected to the positive side output terminal of the power supply circuit 5. The terminal of the voltage division resistor 15d opposite to the terminal thereof connected to the voltage division resistor 15b is grounded (i.e., connected to a ground line (GND) at 0 V). The power supply circuit 5 outputs a 5 V direct-current voltage via the positive output terminal thereof.

The other end of the temperature sensor 3 is connected to the anode of the diode 14a. The transistor 13a has the collector thereof connected to the cathode of the diode 14a, has the emitter thereof grounded via the bias resistor 16a, and has the base thereof connected to the node between the voltage division resistors 15a and 15c. The terminal of the voltage division resistor 15c opposite to the terminal thereof connected to the voltage division resistor 15a is connected to the positive side output terminal of the power supply circuit 5. The terminal of the voltage division resistor 15a opposite to the terminal thereof connected to the voltage division resistor 15c is grounded.

As the current that flows between the collector and emitter of the transistor 13a increases, the voltage that appears across the bias resistor 16a increases, but the base voltage with respect to the emitter so varies as to decrease the base current. This is because the base potential of the transistor 13a is kept substantially fixed by the voltage division resistors 15a and 15c. As the base current decreases, the current that flows between the collector and emitter decreases. Through this operation, even if an abnormal voltage (overvoltage) is externally applied to the temperature sensor 3 or to a circuit connected thereto, the maximum value of the abnormal current is kept substantially fixed irrespective of the magnitude of the abnormal voltage, preventing overcurrent. The high potential side current limiter 6b functions in a similar manner. In this way, with a simple circuit design, the overcurrent protection circuit 6 prevents an overcurrent resulting from an overvoltage.

The overcurrent protection circuits 6 included in a power supply apparatus according to the present invention may be given any circuit design other than the one specifically described above, so long as they are so built as to limit a current and thereby prevent an overcurrent. For example, as will be described with reference to FIG. 5, the overcurrent protection circuits may be built with voltage division resistors that limit a current in response to an overvoltage.

In the overcurrent protection circuits 6 (i.e., the current limiters 6a and 6b), the limit current level mentioned above is set, for example, at 1 mA. This limit current level may be smaller or greater than 1 mA. The limit current level set by the overcurrent protection circuits 6 effects the voltage that appears across the temperature sensor 3. This is because the voltage across the temperature sensor 3 is proportional to the electrical resistance multiplied by the current. If the set limit current level is too small, the voltage appearing across the temperature sensor 3 is so small as to make it difficult to accurately detect the electrical resistance and thus the battery temperature. By contrast, if the set limit current level is too great, overcurrent protection is no longer possible, leading to circuit failure. Accordingly, the limit current level set by the overcurrent protection circuits 6 is, preferably, in the range from 100 μA to 5 mA.

In the normal state, a current (hereinafter referred to as the temperature detection current) for producing a voltage across the temperature sensor 3 flows from the positive side output terminal of the power supply circuit 5 via the current limiter 6b and the diode 14b into the current detection resistor 12 and the temperature sensor 3. The temperature detection current then flows via the diode 14a and the current limiter 6a to ground at 0 V. The diodes 14a and 14b are so connected that the forward direction thereof coincides with the direction in which the temperature detection current flows.

The voltage detection circuit 8 detects the voltage that appears across the temperature sensor 3 and the voltage that appears across the current detection resistor 12 both as a result of the temperature detection current flowing therethrough, and then, based on those detected voltages, the electrical resistance of the temperature sensor 3 and thus the battery temperature. Here, the current detection resistor 12 also serves as a voltage division resistor. Let the voltage appearing across the current detection resistor 12 be ER, and the previously determined electrical resistance of the current detection resistor 12 be RC. Then, the current I that flows through the temperature sensor 3 is give by the following formula:

$$I=ER/RC.$$

Moreover, let the voltage appearing across the temperature sensor 3 be ET. Then, the electrical resistance RT of the temperature sensor 3 is given by the following formula:

$$RT=ET/I.$$

The electrical resistance RT of the temperature sensor 3 is calculated by an arithmetic processing circuit 21 (FIG. 3), which thus detects, based on the value of the electrical resistance RT, that temperature of the temperature sensor 3 and thus the temperature of the battery 2 that is coupled to the temperature sensor 3.

On the input side of the voltage detection circuit 8, a protection resistor is provided between the voltage detection circuit 8 and the temperature sensor 3. As shown in FIG. 4 (and FIG. 3), the voltage detection circuit 8 includes, on the input side thereof, three high-impedance voltage division circuits 9 for each temperature sensor 3. As shown in FIG. 4, the three high-impedance voltage division circuits 9 provided for each temperature sensor 3 are connected to an upper line 24, a middle line 25, and a lower line 26, respectively. Each high-impedance voltage division circuit 9 includes a serial resistor (protection resistor) 17 and an input resistor 18. In each high-impedance voltage division circuit 9, the input resistor 18 has one end thereof grounded, and has the other end thereof connected to the input side of the multiplexer 10 and to the serial resistor 17.

The node between the current detection resistor 12 and the cathode of the diode 14b is connected to the upper line 24, and is also connected, via the serial resistor 17 of the high-impedance voltage division circuit 9 connected to the upper line 24, to the input side of the multiplexer 10. The middle node 19 between the current detection resistor 12 and the temperature sensor 3 is connected to the middle line 25, and is also connected, via the serial resistor 17 of the high-impedance voltage division circuit 9 connected to the middle line 25, to the input side of the multiplexer 10. The node between the current detection resistor 12 and the anode of the diode 14a is connected to the lower line 26, and is also connected, via the serial resistor 17 of the high-impedance voltage division circuit 9 connected to the lower line 26, to the input side of the multiplexer 10.

In each high-impedance voltage division circuit 9, the serial resistor 17 is given an electrical resistance high enough to prevent an overcurrent from flowing into the multiplexer 10, and the input resistor 18 is given an electrical resistance sufficiently higher than the serial resistor 17 to obtain a voltage division factor of roughly 1. For example, the serial resistor 17 is given an electrical resistance of 150 kΩ, and the input resistor 18 is given an electrical resistance of 2.2 MΩ.

The three high-impedance voltage division circuits 9 divides the voltages (three in total) detected at both ends of the serial circuit composed of the temperature sensor 3 and the current detection resistor 12 and at the middle point 19 thereof, and then feeds those detected voltages to the multiplexer 10. The factor by which the high-impedance voltage division circuits 9 each divide the detected voltages is determined by "the electrical resistance of the input resistor 18 divided by the sum of the electrical resistance of the input resistors 18 and the electrical resistance of the serial resistor 17". If the electrical resistance of the input resistor 18 is 100 times the electrical resistance of the serial resistor 17, then the voltage division factor is 100/101. That is, the high-impedance voltage division circuits 9 multiply their respective detected voltages by 100/101, and then feed the results to the multiplexer 10. In this way, the voltage division factor of the high-impedance voltage division circuits 9 determines the voltages fed to the input side of the multiplexer 10.

Moreover, in a state in which the temperature sensor 3 is short-circuited to the battery 2, the serial resistor 17 and the input resistor 18 provided in each high-impedance voltage division circuit 9 serve to reduce the short-circuiting current that flows to ground.

Moreover, of the protection power supply circuits 23, one is provided between the high-impedance voltage division circuit 9 connected to the upper line 24 and the input side of the multiplexer 10, one is provided between the high-impedance voltage division circuit 9 connected to the middle line 25 and the input side of the multiplexer 10, and one is provided between the high-impedance voltage division circuit 9 connected to the lower line 26 and the input side of the multiplexer 10.

Each protection power supply circuit 23 includes a protection diode 20 whose cathode is connected to the positive side output terminal of the power supply circuit 5 and a protection diode 22 whose anode is grounded. In each protection power supply circuit 23, the anode of the protection diode 20 and the cathode of the protection diode 22 are connected to the node between the input resistor 18 and the serial resistor 17 of the corresponding high-impedance voltage division circuit 9. The cathode of the protection diode 20 of each protection power supply circuit 23 may be connected to a power supply circuit different from the power supply circuit 5.

When the forward voltages of the protection diodes 20 and 22 are ignored, each protection power supply circuit 23 serves to prevent a voltage higher than the supply voltage (for example, 5 V) of the protection power supply circuit 23 or lower than 0 V from being applied to the input side of the multiplexer 10. That is, the protection power supply circuits 23 limit, within a predetermined limit voltage range (for example, from 0 V to 5 V), the voltage applied to the voltage detection circuit 8 side of the corresponding serial resistor 17.

In each protection power supply circuit 23, the protection diode 20, a reverse direction diode, bypasses the voltage fed to the input side of the multiplexer 10 if it is higher than the supply voltage, and the protection diode 22, a reverse diode, bypasses the voltage fed to the input side of the multiplexer 10 if it is lower than 0 V.

The multiplexer 10 switches the voltages across the input resistors 18 provided in each high-impedance voltage division circuit 9 (i.e., the detected voltages obtained through voltage division by each high-impedance voltage division circuit 9) from one to another periodically so that one of those voltages is fed to the A/D converter 11 (FIG. 3) at a time. For example, the voltage across the input resistor 18 of the high-impedance voltage division circuit 9 connected to the upper line 24 is fed to the A/D converter 11, and then, a predetermined period thereafter, the voltage across the input resistor 18 of the high-impedance voltage division circuit 9 connected to the middle line 25 is fed to the A/D converter 11. Then, another predetermined period thereafter, the voltage across the input resistor 18 of the high-impedance voltage division circuit 9 connected to the lower line 26 is fed to the A/D converter 11. The analog signal fed from the multiplexer 10 is, with the predetermined period mentioned above, converted into a digital signal by the A/D converter 11. The digital signal outputted from the A/D converter 11 is fed to the arithmetic processing circuit 21, which then, based on that digital signal, recognizes the voltages across the temperature sensor 3 and the current detection resistor 12 and calculates the electrical resistance of the temperature sensor 3. Then, based on the electrical resistance of the temperature sensor 3, the temperature of the relevant battery 2 is detected.

As shown in FIG. 3, the input side of the multiplexer 10 is connected to all of the serial circuits each composed of a temperature sensor 3 coupled to one of the batteries 2 constituting the battery apparatus 1 and a current detection resistor 12. Thus, the connection between the input and output sides of the multiplexer 10 is switched periodically from one path to another in such a way that the electrical resistances of all the temperature sensors 3 can be detected individually. That is, the connection between the input and output sides of the multiplexer 10 is switched from one path to another so that the A/D converter 11 and the arithmetic processing circuit 21 are fed with one signal after another, namely the signal needed to calculate the electrical resistance of the first temperature sensor 3, then the signal needed to calculate the electrical resistance of the second temperature sensor 3, then the signal needed to calculate the electrical resistance of the third temperature sensor 3, and so forth. In this way, the arithmetic processing circuit 21 (FIG. 3) can recognize the temperatures of all the batteries 2 individually, and, for example when the temperature of any of the batteries 2 becomes higher than a previously determined set temperature, the arithmetic processing circuit 21 (FIG. 3) limits the charging or discharging current of that battery 2 or stops the charging or discharging thereof altogether.

When an abnormal voltage (overvoltage) is externally applied to a temperature sensor 3 or to a circuit connected to a temperature sensor 3, for example when a temperature sensor 3 or a circuit connected to a temperature sensor 3 short-circuits to the surface of a battery 2 and is exposed to a high voltage, thus creating an abnormal state, the temperature detection circuit 4 prevents failure (for example, destruction) of the temperature detection circuit 4 and of the power supply apparatus including it by operating as described below.

In FIG. 4, suppose that the battery 2 has short-circuited to the upper end point A (the middle node 19 between the current detection resistor 12 and the temperature sensor 3) of the temperature sensor 3, causing a voltage (abnormal voltage) of about 50 V to be applied to the point A. The voltage that is applied to the high potential side current limiter 6b and the current (indicated by arrow A1 in FIG. 4) that flows through the current limiter 6b ascribable to the abnormal voltage are blocked by the diode 14b. The voltage that is applied to the multiplexer 10 and the current (indicated by arrow A2 in FIG. 4) that flows to the multiplexer 10 via the upper line 24 are reduced by the high resistance of the serial resistor 17 connected to the upper line 24 and the operation of the protection power supply circuit 23. The voltage that is applied to the multiplexer 10 and the current (indicated by arrow A3 in FIG. 4) that flows to the multiplexer 10 via the middle line 25 are reduced by the high resistance of the serial resistor 17 connected to the middle line 25 and the operation of the protection power supply circuit 23. The voltage that is applied to the multiplexer 10 and the current (indicated by arrow A4 in FIG. 4) that flows to the multiplexer 10 via the lower line 26 are reduced by the high resistance of the serial resistor 17 connected to the lower line 26 and the operation of the protection power supply circuit 23. Moreover, via the diode 14a, a voltage ascribable to the abnormal voltage is applied to and an abnormal current (indicated by arrow A5 in FIG. 4) flows through the low potential side current limiter 6a. However, as the result of the current limiter 6a operating as described above, the maximum value of the magnitude of the abnormal current that flows through the transistor 13a is limited to a substantially fixed level. That is, by the current limiter 6a, the abnormal current that is caused to flow by the abnormal voltage is limited to a substantially fixed current level within the range permitted for an overvoltage or overcurrent. This prevents failure (for example, destruction) of the circuits constituting the power supply apparatus.

If, for example, the very middle point among the serially connected batteries 2 is assumed to have a reference voltage (the 0 V potential of the temperature detection circuit 4), then, when the surface of a battery 2 short-circuits to the point A, a voltage of about minus 50 V may be applied to the point A. In this case, the voltage applied to the low potential side current limiter 6a and the current (indicated by arrow B5 in FIG. 4) that flows through the current limiter 6a ascribable to the abnormal voltage are blocked by the diode 14a. The voltage that is applied to the multiplexer 10 and the current (indicated by arrow B4 in FIG. 4) that flows to the multiplexer 10 via the lower line 26 are reduced by the high resistance of the serial resistor 17 connected to the lower line 26 and the operation of the protection power supply circuit 23. The voltage that is applied to the multiplexer 10 and the current (indicated by arrow B3 in FIG. 4) that flows to the multiplexer 10 via the middle line 25 are reduced by the high resistance of the serial resistor 17 connected to the middle line 25 and the operation of the protection power supply circuit 23. The voltage that is applied to the multiplexer 10 and the current (indicated by arrow B2 in FIG. 4) that flows to the multiplexer 10 via upper line 24 are reduced by the high resistance of the serial resistor 17 connected to the upper line 24 and the operation of the protection power supply circuit 23. Moreover, via the diode 14b, a voltage ascribable to the abnormal voltage (minus 50 V) is applied to and an abnormal current (indicated by arrow B1 in FIG. 4) flows through the high potential side current limiter 6b. However, as the result of the current limiter 6b operating as described above, the maximum value of the magnitude of the abnormal current that flows through the transistor 13b is limited to a substantially fixed level. That is, by the current limiter 6b, the abnormal current that is caused to flow by the abnormal voltage is limited to a substantially fixed current level within the range permitted for an overvoltage or overcurrent. This prevents failure (for example, destruction) of the circuits constituting the power supply apparatus.

An abnormal state as described above in which an abnormal voltage is applied can be recognized by the appearance of a voltage exceeding the normal voltage range on the upper, middle, or lower line 24, 25, or 26 corresponding to any of the temperature sensor 3. When such a voltage indicating an abnormal state is detected, the temperature sensor 3 located at the corresponding position is judged to be exposed to an abnormal voltage (for example, it is judged to be short-circuited to a battery 2), but the temperature of the battery 2 corresponding to that temperature sensor 3 is not judged to be abnormal. In this case, it is possible to notify the vehicle of the abnormal state, or to perform, within the arithmetic processing circuit 21 or elsewhere, operation such as complementing the data of the temperature sensor 3 in the abnormal state with the data of other temperature sensors 3.

Figure 5:
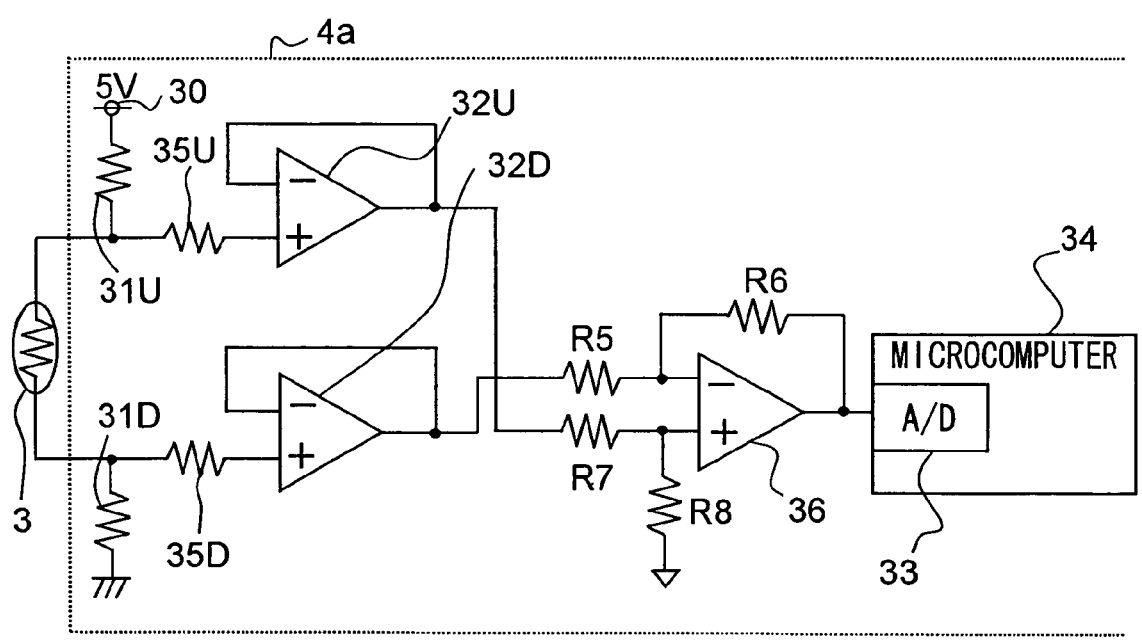
FIG. 5 is a circuit diagram (designed against short-circuiting to the supply voltage) of a modified example of the temperature detection circuit shown in FIG. 1.

The temperature detection circuit 4 shown in FIGS. 1 to 4 may be replaced with the temperature detection circuit 4a shown in FIG. 5. The temperature detection circuit 4a shown in FIG. 5 is designed against short-circuiting of the temperature sensor 3 to the supply voltage. Specifically, the temperature detection circuit 4a shown in FIG. 5 is designed against short-circuiting to a high voltage of about 12 V supplied from a lead storage battery (not illustrated) mounted on a vehicle for the electric circuitry thereof. That is, the temperature detection circuit 4a shown in FIG. 5 is designed against a high voltage of about 12 V. Incidentally, the temperature detection circuit 4 shown in FIGS. 1 to 4 is designed against a high voltage of about 50 V.

Figure 6:
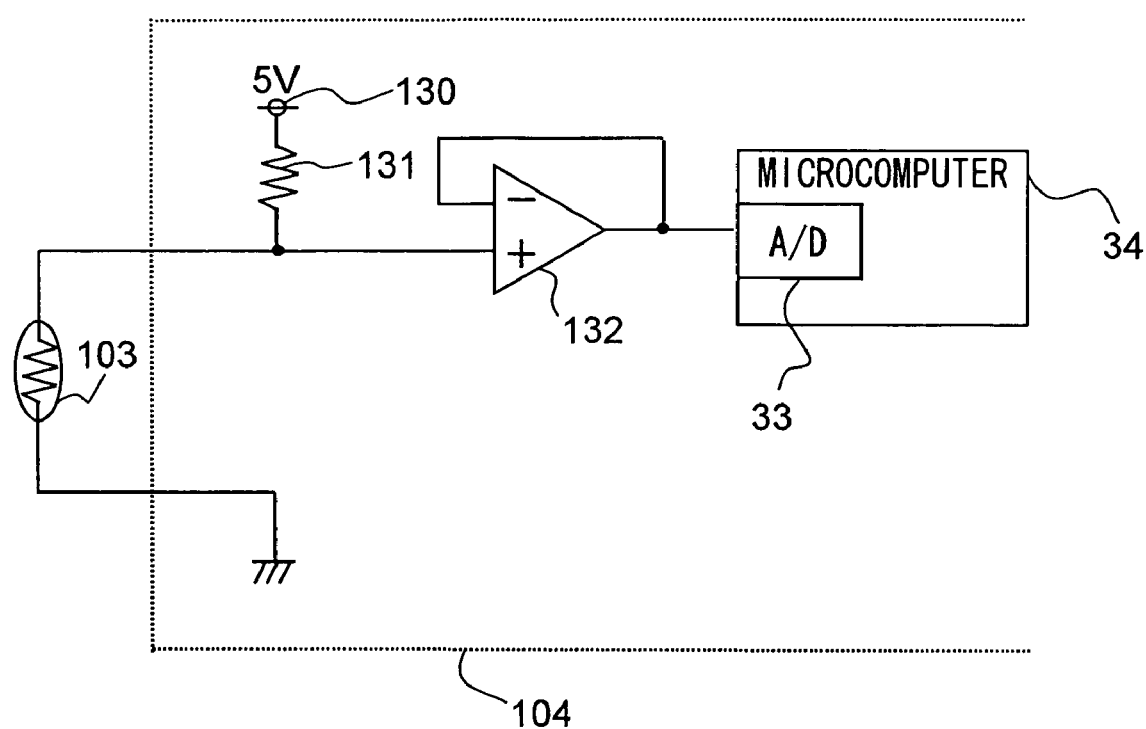
FIG. 6 is a circuit diagram (designed against short-circuiting to the supply voltage) of a conventional temperature detection circuit.

Now, in comparison with FIG. 6, a description will be given of how the temperature sensor 3 shown in FIG. 5 is designed against short-circuiting to the supply voltage, i.e., the circuit design and operation of the temperature detection circuit 4a. FIG. 5 shows the design adopted in this embodiment against short-circuiting to the supply voltage, i.e., a circuit diagram of the temperature detection circuit 4a. FIG. 6 shows the design conventionally adopted against short-circuiting to the supply voltage, i.e., a circuit diagram of a conventional temperature detection circuit 104.

The temperature detection circuit 104 shown in FIG. 6 measures temperature by measuring the voltage applied to the temperature sensor 3. As shown in FIG. 6, from a power supply 130 of about 5V, a current and a voltage are fed via a voltage division resistor 131 to a temperature sensor 103 realized with a thermistor. The voltage at the upper terminal of the temperature sensor 103 uses an operational amplifier 132 as a buffer, is then fed to an A/D converter 33, and is then processed by a microcomputer 34. In this circuit, if the lower end of the temperature sensor 103 conducts to the 12 V output of a lead storage battery (not illustrated) mounted on a vehicle for the electric circuitry thereof, this means that the 12 V supply voltage is connected to ground. This causes a large current to flow, and is therefore very dangerous (generally referred to as short-circuiting to the supply voltage). Such a temperature sensor 103 is used, for example to measure the temperature of the atmosphere in which a battery is placed.

The temperature detection circuit 4a shown in FIG. 5 is so designed as to prevent such a danger. The temperature sensor 3 shown in FIG. 5 is identical with the temperature sensor 3 shown in FIG. 4, and is thermally coupled to a battery 2 (see FIG. 4) included in a battery apparatus 1. Alternatively, the temperature sensor 3 shown in FIG. 5 may be used to measure the temperature of the atmosphere in which the battery 2 is placed. In FIG. 5, such components as are found also in FIG. 6 are identified with common symbols.

In the temperature detection circuit 4a shown in FIG. 5, to both ends of the temperature sensor 3 are respectively connected voltage division resistors 31U and 31D, which serve as an overcurrent protection circuit. The temperature sensor 3 shown in FIG. 5 has one end thereof connected via the high potential side voltage division resistor 31U to the positive side output terminal of a power supply circuit 30, and has the other end thereof grounded via the low potential side voltage division resistor 31D. That is, the temperature sensor 3 shown in FIG. 5 is fed with a current and a voltage from the power supply circuit 30. The power supply circuit 30 is identical with the power supply 130 shown in FIG. 6, and yields, for example, a 5 V supply voltage.

The resistances of the voltage division resistors 31U and 31D are so set that the sum of the resistances is equal to that of the voltage division resistor 131 in FIG. 6. Accordingly, if the temperature sensor 3 used in FIG. 5 is identical with the temperature sensor 103 used in FIG. 6, the voltage output characteristic between both terminals of the temperature sensor 3 shown in FIG. 5 is identical with the voltage output characteristic between both terminals of the temperature sensor 103 shown in FIG. 5. Then, the circuit shown in FIG. 5 can use the same A/D converter 33, microcomputer 34, and software for driving the microcomputer 34 as those used in FIG. 6.

The node between the temperature sensor 3 and the voltage division resistor 31U is connected, via a serial resistor 35U for protecting an operational amplifier 32U, to the non-inverting input terminal (+) of the operational amplifier 32U. The node between the temperature sensor 3 and the voltage division resistor 31D is connected, via a serial resistor 35D for protecting an operational amplifier 32D, to the non-inverting input terminal (+) of the operational amplifier 32D. The operational amplifier 32U has the inverting input terminal (−) thereof connected to its own output terminal so as to function as a buffer. The operational amplifier 32D has the inverting input terminal (−) thereof connected to its own output terminal so as to function as a buffer.

The outputs from the operational amplifiers 32U and 32D are fed to an operational amplifier 36, which amplifies the difference between those outputs. The operational amplifier 36 has resistors R5, R6, R7, and R8 connected thereto so as to function as a differential amplifier circuit as a whole. More specifically, the output terminal of the operational amplifier 32U is connected via the resistor R7 to the non-inverting input terminal (+) of the operational amplifier 36; the output terminal of the operational amplifier 32D is connected via the resistor R5 to the inverting input terminal (−) of the operational amplifier 36, and is also connected via the resistors R5 and R6 to the output terminal of the operational amplifier 36. Furthermore, the non-inverting input terminal (+) of the operational amplifier 36 is grounded via the resistor R8. The output from the operational amplifier 36 is fed to a A/D converter 33 provided in the microcomputer 34.

It should be understood that any specific value mentioned in the description of the embodiments given above, for example 5 V as the output voltage of the power supply circuit 5, 150 kΩ as the electrical resistance of the serial resistor 17, etc., are merely examples, and are not intended the present invention in any way.

What is claimed is:

1. A power supply apparatus comprising:
    a battery apparatus that is composed of a battery;
    a temperature sensor that is thermally coupled to the battery and whose electrical resistance changes with a temperature of the battery;
    a temperature detection circuit that detects the temperature of the battery by detecting the electrical resistance of the temperature sensor; and a power supply circuit that feeds electrical power to the temperature detection circuit, wherein the temperature sensor is connected via an overcurrent protection circuit to the power supply circuit, and wherein when an abnormal voltage is applied to the temperature sensor from a voltage source different from the power supply circuit, the overcurrent protection circuit limits, within a predetermined limit current level, magnitude of an abnormal current that the abnormal voltage causes to flow into or out of the power supply circuit.

2. The power supply apparatus of claim 1,
wherein the power supply circuit feeds a temperature detection current for producing a voltage across the temperature sensor to the temperature sensor via the overcurrent protection circuit.

3. The power supply apparatus of claim 2,
wherein the overcurrent protection circuit includes:
a diode that is connected to one end of the temperature sensor so that a forward direction of the diode coincides with a direction in which the temperature detection current flows; and
a current controller that is connected to another end of the temperature sensor and that, when the abnormal voltage is applied to the temperature sensor, limits the magnitude of the abnormal current within the predetermined limit current level.

4. The power supply apparatus of claim 3,
wherein the current controller includes:
a bipolar transistor that receives a predetermined potential at a base thereof, that has a collector thereof connected to the temperature sensor, and that has an emitter thereof connected to a bias resistor.

5. The power supply apparatus of claim 2,
wherein the overcurrent protection circuit includes two sets, respectively connected to each end of the temperature sensor, of:
a diode whose forward direction coincides with a direction in which the temperature detection current flows; and
a current controller that, when the abnormal voltage is applied to the temperature sensor, limits the magnitude of the abnormal current within the predetermined limit current level.

6. The power supply apparatus of claim 4,
wherein the current controller includes:
a bipolar transistor that receives a predetermined potential at a base thereof, that has a collector thereof connected to the temperature sensor, and that has an emitter thereof connected to a bias resistor.

7. The power supply apparatus of claim 2,
wherein the temperature detection circuit comprises a voltage detection circuit that detects the voltage produced across the temperature sensor by the temperature detection current, so that the temperature detection circuit detects the electrical resistance of the temperature sensor based on the voltage across the temperature sensor, and wherein the voltage detection circuit comprises a protection resistor, and detects the voltage across the temperature sensor based on a voltage received via the protection resistor.

8. The power supply apparatus of claim 7,
wherein the voltage detection circuit comprises a protection power supply circuit,
wherein the protection resistor is provided between the protection power supply circuit and the temperature sensor,
wherein the protection power supply circuit keeps a voltage applied to the protection power supply circuit side of the protection resistor within a predetermined limit voltage range, and
the voltage detection circuit detects the voltage across the temperature sensor based on the voltage received via the protection resistor and the protection power supply circuit.

9. The power supply apparatus of claim 1,
wherein both ends of the temperature sensor are connected to the overcurrent protection circuit.

10. A power supply apparatus comprising:
a battery apparatus that is composed of a plurality of batteries;
a plurality of temperature sensors of which each is thermally coupled to at least one of the batteries and whose electrical resistances change with temperatures of the batteries;
a temperature detection circuit that has, on an input side thereof, a multiplexer for switching among the temperature sensors for individual detection of the electrical resistances thereof; and
a power supply circuit that feeds electrical power to the temperature detection circuit,
wherein the temperature sensors are each connected via an overcurrent protection circuit to the power supply circuit, and
wherein, when an abnormal voltage is applied to the temperature sensor from a voltage source different from the power supply circuit, the overcurrent protection circuit limits, within a predetermined limit current level, magnitude of an abnormal current that the abnormal voltage causes to flow into or out of the power supply circuit.

* * * * *